United States Patent

Murota et al.

[11] Patent Number: 5,478,543
[45] Date of Patent: Dec. 26, 1995

[54] COMPOUND OXIDE HAVING OXYGEN ABSORBING AND DESORBING CAPABILITY AND METHOD FOR PREPARING SAME

[75] Inventors: Tadatoshi Murota, Miki; Kazuhiro Yamamoto, Kobe; Shigeru Aozasa, Amagasaki, all of Japan

[73] Assignee: Santoku Metal Industry Co., Ltd., Hyogo, Japan

[21] Appl. No.: 263,608

[22] Filed: Jun. 20, 1994

[30] Foreign Application Priority Data

Jun. 21, 1993 [JP] Japan .................. 5-149358

[51] Int. Cl.$^6$ .............. C01F 17/00; C01B 13/00
[52] U.S. Cl. .............. 423/263; 423/579; 502/304
[58] Field of Search .................. 423/579, 593, 423/263; 502/304

[56] References Cited

U.S. PATENT DOCUMENTS 5,019,366 5/1991 Sakai ...................... 429/579
5,292,496 3/1994 Nagashima et al. ............. 502/304

FOREIGN PATENT DOCUMENTS

| 103026 | 6/1985 | Japan | 423/263 |
| 166222 | 8/1985 | Japan | 423/263 |
| 23213 | 1/1991 | Japan | 423/263 |

*Primary Examiner*—Wayne Langel
*Attorney, Agent, or Firm*—Darby & Darby

[57] ABSTRACT

A compound oxide having oxygen absorbing and desorbing capability contains 4.99–98.99% by weight of cerium oxide, 1–95% by weight of zirconium oxide and 0.01–20% by weight of hafnium oxide. The compound oxide has an oxygen absorbing and desorbing capability of at least 100 μmol/g at 400–700° C. and a specific surface area of at least 10 m$^2$/g after heating at 900° C. for 5 hours.

16 Claims, No Drawings

COMPOUND OXIDE HAVING OXYGEN ABSORBING AND DESORBING CAPABILITY AND METHOD FOR PREPARING SAME

BACKGROUND OF THE INVENTION

The present invention relates to a compound oxide possessing especially excellent oxygen absorbing and desorbing capability and utilizable for a catalyst for purifying exhaust gas and for ceramics as well as a method for preparing same.

From the past, a cerium oxide is used in large quantities for catalysts for purifying exhaust gas and for ceramics, and in the filed of catalysts, for example, for enhancing the purification rate of exhaust gas components such as hydrocarbons, carbon monoxide and $NO_x$ taking advantage of the characteristic property of cerium oxide capable of absorbing oxygen in an oxidative atmosphere and desorbing oxygen in a reducing atmosphere, while in the filed of ceramics, for use in electroconductive ceramics such as solid electrolytes taking advantage of the aforesaid characteristic property of cerium oxide. Such cerium oxide heretofore known is usually prepared, for example, by adding oxalic acid or ammonium bicarbonate to a solution of nitrate or hydrochloride of cerium, filtering and washing the resultant precipitate and drying followed by baking it.

However, a conventional oxide composed predominantly of cerium oxide prepared according to the above method, though it possesses oxygen absorbing and desorbing capability, fails to absorb or desorb oxygen sufficiently at a temperature of 400°–700° C. and brings about a drawback such that it is reduced in specific surface area after heating at a higher temperature and is thus lowered in performance.

SUMMARY OF THE INVENTION

It is, therefore, an object of the present invention to provide a novel compound oxide possessing especially excellent oxygen absorbing and desorbing capability and durability at a high temperature as well as a method for preparing same.

It is another object of the present invention to provide a method for easily preparing the compound oxide possessing especially excellent oxygen absorbing and desorbing capability and durability at a high temperature in good reproducible manner.

The above and other objects of the present invention will become apparent more fully from the following description.

In accordance with the present invention, there is provided a compound oxide having oxygen absorbing and desorbing capability, which comprises 4.99–98.99% by weight of cerium oxide, 1–95% by weight of zirconium oxide and 0.01–20% by weight of hafnium oxide and has an oxygen absorbing and desorbing capability of at least 100 μmol/g at 400°–700° C. and a specific surface area of at least 10 $m^2$/g after being heated for 5 hours.

In accordance with the present invention, there is also provided a method for preparing the compound oxide having oxygen absorbing and desorbing capability, which comprises the steps of mixing a first solution containing cerium ion, zirconium ion and hafnium ion with a second solution selected from the group consisting of an aqueous solution of ammonia, an aqueous solution of ammonium bicarbonate and an aqueous solution of oxalic acid to prepare a compound salt precipitate containing cerium, zirconium and hafnium, and baking the precipitate at a temperature of at least 300° C.

PREFERRED EMBODIMENT OF THE INVENTION

The present invention will now be explained in more detail hereunder.

The compound oxide of the present invention having oxygen absorbing and desorbing capability (referred to hereinafter simply as "the compound oxide") contains as indispensable components thereof 4.99–98.99% by weight of cerium oxide, 1–95% by weight of zirconium oxide and 0.01–20% by weight of hafnium oxide. If the proportion of each component is outside the range above mentioned, the compound oxide will be unable to display excellent oxygen absorbing and desorbing capability. Further, the compound oxide may contain, in addition to the indispensable components, i.e. cerium oxide, zirconium oxide and hafnium oxide, an additional metal oxide or oxides such as titanium oxide, tungsten oxide, nickel oxide, copper oxide, iron oxide, aluminum oxide, silicon oxide, beryllium oxide, magnesium oxide, calcium oxide, strontium oxide, barium oxide, radium oxide, oxides of rare earth metals other than cerium, or mixtures thereof. The additional metal oxide is contained preferably in a proportion up to 10% by weight of the total weight of the compound oxide.

The compound oxide of the present invention has an oxygen absorbing and desorbing capability of at least 100 μmol/g, preferably 150–1000 μmol at a temperature range of 400°–700° C., and also has a specific surface area of at least 10 $m^2$/g after being heated at 900° C. for 5 hours and preferably 30–100 $m^2$/g, more preferably 50–100 $m^2$/g after being heated at 800° C. for 5 hours. No special limitation exists in the compound oxide so far as it has the above oxygen absorbing and desorbing capability value and the above specific surface area after being heated at a specified temperature for a specified period of time. The shape of the compound oxide is preferably in a spherical or cubic form. The compound oxide has preferably a particle size of 0.1–0.5 μm.

For the preparation of the compound oxide of the present invention, a solution containing cerium ion, zirconium ion and hafnium ion is mixed with an aqueous solution of ammonia, ammonium bicarbonate or oxalic acid to prepare a compound salt precipitate containing cerium, zirconium and hafnium. In this case, the solution containing cerium ion, zirconium ion and hafnium ion can be obtained, for example, by mixing together an aqueous solution of cerium nitrate, an aqueous solution of zirconium nitrate and an aqueous solution of hafnium nitrate. In this case, furthermore, the above aqueous solutions may optionally be mixed with a solution containing titanium ion, tungsten ion, nickel ion, copper ion, iron ion, aluminum ion, silicon ion, beryllium ion, magnesium ion, calcium ion, strontium ion, barium ion, radium ion or rare earth metal ion other than cerium ion or mixtures thereof. The solution containing cerium ion, zirconium ion and hafnium ion has a concentration within a range of preferably 30–200 g/l, more preferably 50–100 g/l based on the individual ions in terms of oxide. The proportion of the cerium ion, zirconium ion and hafnium ion as well as the other metal ions optionally admixed therewith may be 4.99–98.99:1–95:0.01–20:0–10 by weight ratio in terms of oxides. In case the aqueous solution of ammonia is used, the concentration of ammonia is within a range of preferably 1–2N, more preferably 1–1.5N. In case the aqueous solution of ammonium bicarbonate is used, the concentration of the bicarbonate is within a range of preferably 50–200 g/l, more preferably 100–150 g/l. In case the aqueous solution of oxalic acid is used, the concentration of the oxalic acid is within a range of preferably 50–100 g/l, more preferably 50–60 g/l. The mixing ratio of the solution containing cerium ion, zirconium ion and hafnium ion to the aqueous solution of ammonia, ammonium bicarbonate or oxalic acid is preferably 1:1–1:10 by weight. The composite salt precipitate obtained in this case is, for example, a compound oxide hydrate.

The compound oxide of the present invention can then be prepared by baking the resultant compound salt precipitate at a temperature of 300° C. or higher, preferably at 300°–400° C. In the method of the present invention, the compound salt precipitate may previously be subjected to an optional hydrothermal treatment prior to baking the precipitate. This hydrothermal treatment is desirably carried out by using an ordinary autoclave or the like device at a temperature within a range of 100°–135° C. for a period of 0.5 to 1 hour. When the baking temperature is lower than 300° C., the precipitate is hardly converted into an oxide. The baking time is preferably 1–10 hours.

The compound oxide obtained according to the method of the present invention can be used as such or may be admixed, for example, with a rare earth metal nitrate prior to actual use.

The compound oxide of the present invention contains as indispensable components thereof cerium oxide, zirconium oxide and hafnium oxide and has an oxygen absorbing and desorbing capability of at least 100 µmol/g within a temperature range of 400°–700° C. and a specific surface area of at least 10 m$^2$/g after heating at 900° C. for 5 hours. Thus, the compound oxide is extremely useful in the field of catalysts and ceramics, substituting for the conventional cerium oxide. According to the method of the present invention, the compound oxide having an excellent oxygen absorbing and desorbing capability and durability at a high temperature can easily be produced in good reproducible manner.

Upon adsorption of oxygen, the valence of cerium in the cerium oxide increases from +to +4 and reverts to +upon desorption of oxygen.

EXAMPLES OF THE INVENTION

The present invention will now be illustrated in more detail by way of Examples, but it is to be construed that the present invention is not limited by these Examples.

Example 1

149.5 Milliliters of an aqueous solution of cerium nitrate 2prepared by dissolving cerium nitrate of high purity (prepared by Santoku Metal Industry Co., Ltd.; purity: 99.9%) in water to have a concentration of 300 g/l in terms of cerium oxide were mixed with 13 ml of an aqueous solution of zirconium nitrate prepared by dissolving zirconium nitrate (prepared by Daiichi Kigenso Kagaku Kogyo Co., Ltd.; purity: 97%) in water to have a concentration of 25% by weight in terms of zirconium oxide and 15 ml of an aqueous solution of hafnium nitrate prepared by dissolving hafnium nitrate (prepared by Wako Pure Chemical Industries, Ltd.; purity: 97%) in water to have a concentration of 10 g/l in terms of hafnium oxide thereby preparing a solution containing cerium ion, zirconium ion and hafnium ion having a ratio of Ce:Zr:Hf=89.7:10:0.3 (by weight) and a concentration of 50 g/l in terms of the compound oxide. With one liter of the resultant solution was then admixed with one liter of a separately prepared aqueous solution of ammonium bicarbonate having a concentration of 150 g/l to obtain 50 g of a precipitate of a compound carbonate containing cerium, zirconium and hafnium. The resultant compound carbonate was baked at 300° C. for 5 hours to yield 50 g of a compound oxide containing cerium, zirconium and hafnium having a specific surface area of 85 m$^2$/g. The compound oxide thus obtained showed a specific surface area of 28 m$^2$/g after heating at 900° C. for 5 hours. An oxygen absorbing and desorbing capability of the compound oxide was measured by charging 1 g of the compound oxide into a cylindrical furnace and measuring a value of capability by way of gas chromatography while flowing a stream of hydrogen and oxygen gases through the cylinder whereupon the oxygen absorbing desorbing capability was 153 µmol/g at 400°–700° C. The proportion of cerium oxide, zirconium oxide and hafnium oxide in the compound oxide was 89.7% by weight, 10% by weight and 0.3% by weight, respectively.

Example 2

115 Milliliters of the aqueous solution of cerium nitrate, 40 ml of the aqueous solution of zirconium nitrate and 50 ml of the aqueous solution of hafnium nitrate each prepared in the foregoing Example 1 were mixed together to prepare a solution containing cerium ion, zirconium ion and hafnium ion having a ratio of Ce:Zr:Hf=69:1:30 (by weight) and a concentration of 50 g/l in terms of the compound oxide. The solution was treated in the same manner as illustrated in Example 1 to obtain 50 g of a compound oxide having a specific surface area of 81 m$^2$/g. The compound oxide thus obtained showed a specific surface area of 29 m$^2$/g after heating at 900° C. for 5 hours and an oxygen absorbing and desorbing capability of 160 µmol/g at 400°–700° C. The proportion of cerium oxide, zirconium oxide and hafnium oxide in the compound oxide was 69% by weight, 1% by weight and 30% by weight, respectively.

Example 3

142 Milliliters of the aqueous solution of cerium nitrate prepared in the foregoing Example 1, 13 ml of a 25% by weight aqueous solution of zirconium nitrate prepared by dissolving in water zirconium nitrate containing hafnium in an amount 3% by weight based on the total amount of zirconium and 25 ml of an aqueous solution of neodymium nitrate prepared by dissolving neodymium nitrate (prepared by Santoku Metel Industry Co., Ltd.; purity: 99.9%) in water to have a concentration of 100 g/l in terms of neodymium oxide were mixed together to prepare a solution containing cerium ion, zirconium ion, hafnium ion and neodymium ion having a ratio of Ce:Zr:Hf:Nd=85:9.7:0.3:5 (by weight) and a concentration of 50 g/l in terms of the compound oxide. An operation was then carried out in the same manner as illustrated in Example 1 to obtain 50 g of a compound oxide having a specific surface area of 103 m$^2$/g. The resultant compound oxide showed a specific surface area of 32 m$^2$/g after heating at 900° C. for 5 hours and an oxygen absorbing and desorbing capability of 176 µmol/g at 400°–700° C. The proportion of cerium oxide, zirconium oxide, hafnium oxide and neodymium oxide contained in the compound oxide was 85% by weight, 9.7% by weight, 0.3% by weight and 5% by weight, respectively.

Although the present invention has been described with reference to the preferred examples, it should be understood that various modifications and variations can be easily made by those skilled in the art without departing from the spirit of the invention. Accordingly, the foregoing disclosure should be interpreted as a limiting sense. The present inven-

What is claimed is:

1. A compound oxide having oxygen absorbing and desorbing capability, which comprises 4.99–98.99% by weight of cerium oxide, 1–95% by weight of zirconium oxide and 0.01–20% by weight of hafnium oxide, the compound oxide having an oxygen absorbing and desorbing capability of at least 100 μmol/g at 400°–700° C. and a specific surface area of at least 10 m$^2$/g after heating at 900° C. for 5 hours.

2. A compound oxide according to claim 1, wherein the compound oxide contains an additional oxide selected from the group consisting of titanium oxide, tungsten oxide, nickel oxide, copper oxide, iron oxide, aluminum oxide, silicon oxide, beryllium oxide, magnesium oxide, calcium oxide, strontium oxide, barium oxide, radium oxide, oxides of rare earth metals other than cerium, and mixtures thereof in an amount up to 10% by weight based on a total weight of the compound oxide.

3. A compound oxide according to claim 1, wherein the compound oxide has an oxygen absorbing and desorbing capability of 150–1000 μmol/g at 400°–700° C.

4. A compound oxide according to claim 1, wherein the compound oxide has a specific surface area of 30–100 m$^2$/g after heating it at 800° C. for 5 hours.

5. A compound oxide according to claim 1, wherein the compound oxide has a particle size of 0.1–0.5 μm.

6. A method for preparing the compound oxide according to claim 1, which comprises the steps of mixing a first solution containing cerium ion, zirconium ion and hafnium ion with a second solution selected from the group consisting of an aqueous solution of ammonia, an aqueous solution of ammonium bicarbonate and an aqueous solution of oxalic acid to prepare a compound salt precipitate containing cerium, zirconium and hafnium, and baking the precipitate at a temperature of at least 300° C., the cerium ion, the zirconium ion, and the hafnium ion being contained in the first solution in an amount of 4.99–98.99:1–95:0.01–20 in terms of oxide weight ratio.

7. A method according to claim 6, wherein the first solution is obtained by mixing together an aqueous solution of cerium nitrate, an aqueous solution of zirconium nitrate and an aqueous solution of hafnium nitrate.

8. A method according to claim 6, wherein the first solution contains an additional ion selected from the group consisting of titanium ion, tungsten ion, nickel ion, copper ion, iron ion, aluminum ion, silicon ion, beryllium ion, magnesium ion, calcium ion, strontium ion, barium ion, radium ion, rare earth metal ions other than cerium ion and mixtures thereof.

9. A method according to claim 6, wherein the cerium ion, the zirconium ion and the hafnium ion are contained in the first solution in an amount of 30–200 g/l in terms of oxide basis.

10. A method according to claim 8, wherein the additional ion is contained in the first solution in an amount of 0–10 in terms of oxide weight ratio.

11. A method according to claim 6, wherein the second solution is an aqueous solution of ammonia having a concentration of 1–2N.

12. A method according to claim 6, wherein the second solution is an aqueous solution of ammonium bicarbonate having a concentration of 50–200 g/l.

13. A method according to claim 6, wherein the second solution is an aqueous solution of oxalic acid having a concentration of 50–100 g/l.

14. A method according to claim 6, wherein the first solution is mixed with the second solution in a weight ratio of from 1:1 to 1:10.

15. A method according to claim 6, wherein the compound salt precipitate is baked at 300°–400° C. for 1–10 hours.

16. A method according to claim 6, wherein the compound salt precipitate is subjected to a hydrothermal treatment conducted at 100°–135° C. for 0.5–1 hour prior to the baking.

\* \* \* \* \*